June 25, 1935. L. M. GOLDSMITH Re. 19,622

VALVE MECHANISM

Original Filed May 22, 1928 2 Sheets-Sheet 1

Inventor

Lester M. Goldsmith

By T. Wallace Lim

Attorney

VALVE MECHANISM

Original Filed May 22, 1928 2 Sheets-Sheet 2

Inventor
Lester M. Goldsmith
By T. Wallace Finn
Attorney

Reissued June 25, 1935

Re. 19,622

UNITED STATES PATENT OFFICE 19,622

VALVE MECHANISM

Lester M. Goldsmith, Philadelphia, Pa.

Original No. 1,777,303, dated October 7, 1930, Serial No. 279,632, May 22, 1928. Application for reissue September 28, 1932, Serial No. 635,217

3 Claims. (Cl. 251—87)

My invention relates to valves and more particularly to valves utilized to control the flow of hot gases, as from the exhaust of internal combustion engines, for example, of the Diesel type.

In accordance with my invention, there is provided valve structure to effect communication between a supply of fluid, as hot gases from the exhaust of a Diesel engine, and a selected outlet pipe or conduit, or to divide the total flow in any desired proportions between outlet pipes, without substantially obstructing or completely interrupting the flow of the exhaust gases for any position of the valve mechanism; more particularly, all or a portion of the gases may be utilized, as in a waste heat boiler, for the generation of steam and the remainder, if any, of the gases may be passed to atmosphere.

Further in accordance with my invention, the valve structure comprises an apertured disc having one or more ports, disposed within the valve body and rotatable to direct the flow of gases as above stated; more especially one face of the disc is subjected to the pressure of the gases and the other face thereof, preferably machined, is forced thereby into intimate contact with a coacting surface of the valve body having outlet ports therein; more specifically and preferably, the disc is mounted upon and preferably supported solely by, an actuating rod or stem in a manner permitting movement of the disc relative thereto to maintain substantial area and intimacy of engagement between the aforesaid contacting surfaces of the disc and valve body despite warping, or other distortion, resulting, for example, from the high temperature of the gases; still more specifically, the valve disc is, in effect, pivotally mounted on its actuating rod, for restricted extent of movement in any direction.

My invention further resides in features of construction and arrangement of parts as hereinafter described and claimed.

For an understanding of my invention and for an illustration of a form it may take, reference is to be had to the accompanying drawings in which.

Figure 1:
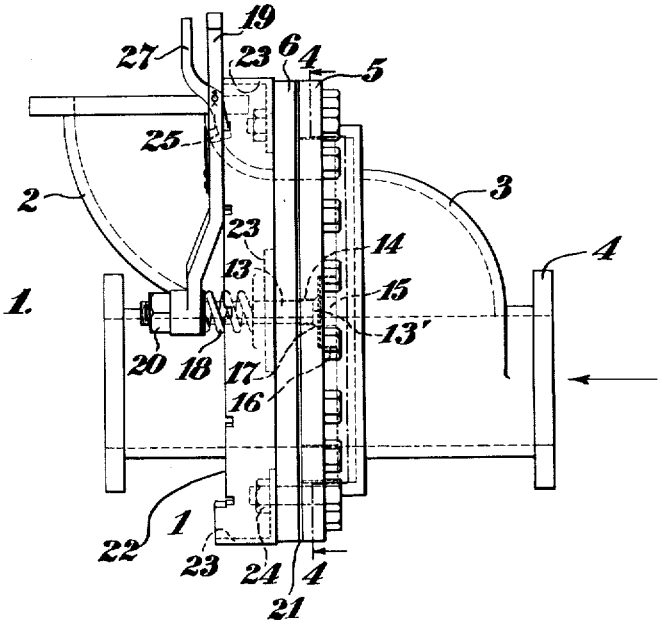
Fig. 1 is a side elevational view of the valve assembly.

Referring to the drawings, the valve body 1 is preferably made up of two castings 2 and 3, respectively, of suitable material, as iron. The member 3 is provided with a flanged portion 4 adapted to be secured in any suitable manner to a fluid supply, for example, to a pipe or equivalent through which is passed the hot exhaust gases from an internal combustion engine, as a Diesel engine or the like. At its opposite end the member 3 is provided with a larger flange 5 clamped in any suitable manner, as by bolts, to a flange 6 of corresponding diameter of the other valve body member 2. Intermediate the flanges 4 and 5, the member 3 is enlarged or bulged, to provide a chamber 7 adapted to receive the exhaust gases, and a recess 8 for a valve disc hereinafter described. The inner face 6' of the member 2 is machined to form a smooth surface against which fits the back 9 of a valve disc 10. The back 9 of the disc 10 and the coacting face 6' of the member 2 are preferably ground to ensure a tight-fitting joint.

The valve disc 10 is provided with an aperture or port 10' of suitable size, as for example, six inches or more depending upon the installation, and corresponding in size and shape to but preferably slightly smaller than the outlet pipes or conduits 11 and 12 which terminate in or comprise an integral part of the valve member 2. The inner openings of the conduits or outlet ports in the machined face of member 2 are so disposed that upon rotation of the valve disc 10 gases within the chamber 7 may flow through the aperture in the valve disc and through either conduit 11 or 12, or for intermediate positions of the valve disc 10 through both conduits, the proportionate amount of gas which flows through the respective conduits being determined by the position of the aperture 10' with respect to such conduits. The conduit 12, for example, may be connected to a pipe or conduit opening directly to atmosphere and the conduit 11 may be connected, for example, to a waste heat boiler, so that the heat of the exhaust gases may be utilized for the generation of steam.

Figure 5:
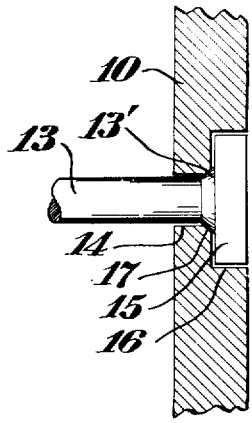
Fig. 5 is an enlarged detail view partly in section showing the connection between the rotatable apertured disc and the actuating rod or stem.
Figure 4:
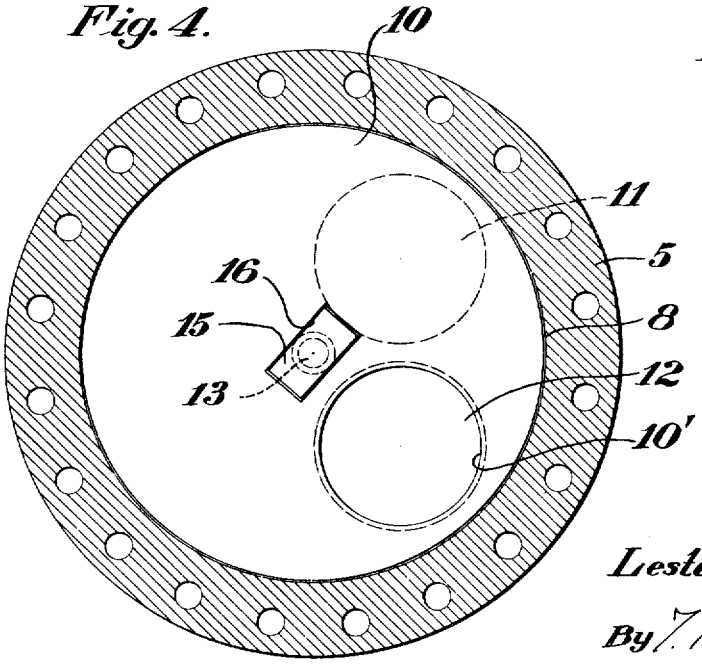
Fig. 4 is an elevational view in section, taken on line 4—4 of Fig. 1, in the direction indicated by the arrows.

A valve stem 13 passes through a suitable opening in casting 2 and extends through the hole 14 in the valve disc 10 (as is clearly shown in Fig. 5), the rectangular, or equivalent, key member 15 at the inner end thereof and preferably integral therewith fitting rather loosely in a recess 16 in the valve disc 10, corresponding substantially in size and shape to said key member. As shown most clearly in Fig. 5, the valve stem 13, intermediate the shank portion and key member 15 is flared outwardly at 13', and such portion engages a seat 17 in the valve disc 10. The seat 17 and the cooperating flared portion 13' of the valve stem are machined, as by grinding, to form a tight joint. Preferably, there is a small clearance between the key member 15 of the valve stem and the bottom of the recess 16 of the valve disc 10 into which such key member fits, as well as between the portion of stem 13 just beyond flared portion 13', and the hole 14 in disc 10.

A metal to metal connection between the disc 10 and its operating stem 13, formed by the flared portion 13' and the recess or co-acting seat 17, forms a tight joint preventing leakage of fluid despite warping of the disc, which may be caused by the high temperatures of exhaust gases, whereas a gasketed joint would fail after an interval of time, and a flat surface joint would leak due to the distortion. As the face of the valve disc 10 is subject to the gas pressure within the chamber 7, the rear machined face 9 of the disc 10 is pressed firmly against the smooth face 6' of the casting 2, which prevents leakage between the disc and the coacting seating surface 6' of body member 2.

In assembling the valve, the smooth or machined surface 9 of the disc 10 is placed against the machined face 6' of the casting 2 and the end of the valve stem 13 away from the key member 15 is passed through the opening 14 of the valve disc and thence through an opening provided therefor in the member 2. A spring 18 is disposed over the portion of the stem 13 which protrudes from the valve body, and the handle 19 is thereafter attached or secured to said end of the valve stem, as for example, by a nut 20. The spring 18 is compressed between the valve member 2 and the handle 19 to hold the flared portion 13' of the valve stem 13 snugly against the seat 17 in the valve disc 10. A gasket 21, of suitable material, as for example, asbestos, is placed between the flanges 5 and 6 of the valve castings 2 and 3. Preferably, as shown, the flange 6 of the member 2 is slightly recessed to provide a retaining or guiding portion for the gasket.

In the valve as assembled, the periphery of the mounted disc 10 is spaced slightly from the adjacent inner wall of the body member 3. In the event of warping or other distortion of the disc 10 or of other parts of the valve structure, the disc 10 is free to pivot about the flared portion 13' of the valve rod or stem 13 to maintain substantial area of and intimate contact between its machined surface 9 and surface 6' of member 2. The clearance between the periphery of the disc and the walls of the inlet chamber, and between the valve disc 10 and key member 15 and the shank portion of the valve stem 13 permit such restricted pivotal movement without binding of the disc or the actuating rod. For all positions of the valve, the area and pressure of engagement between the flared portion 13', preferably a segment of a sphere, and its seat 17 in disc 10 remains substantially unchanged, and effective to prevent leakage.

Figure 2:
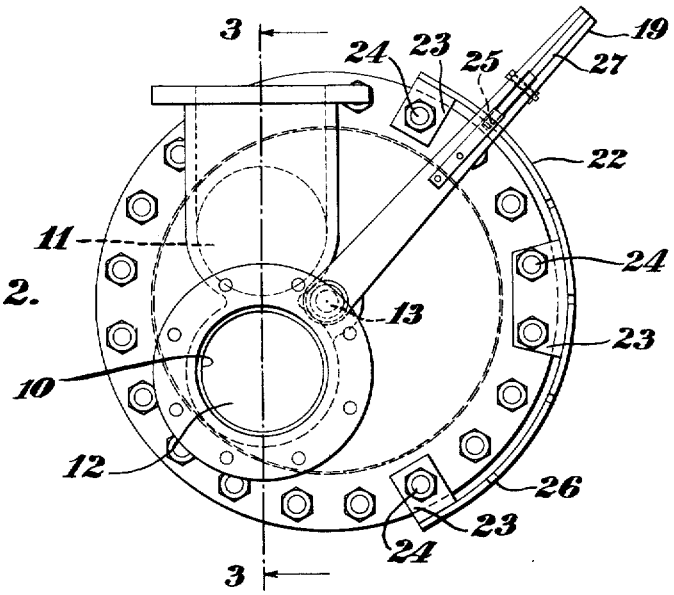
Fig. 2 is a front elevational view of the valve structure of Fig. 1.
Figure 3:
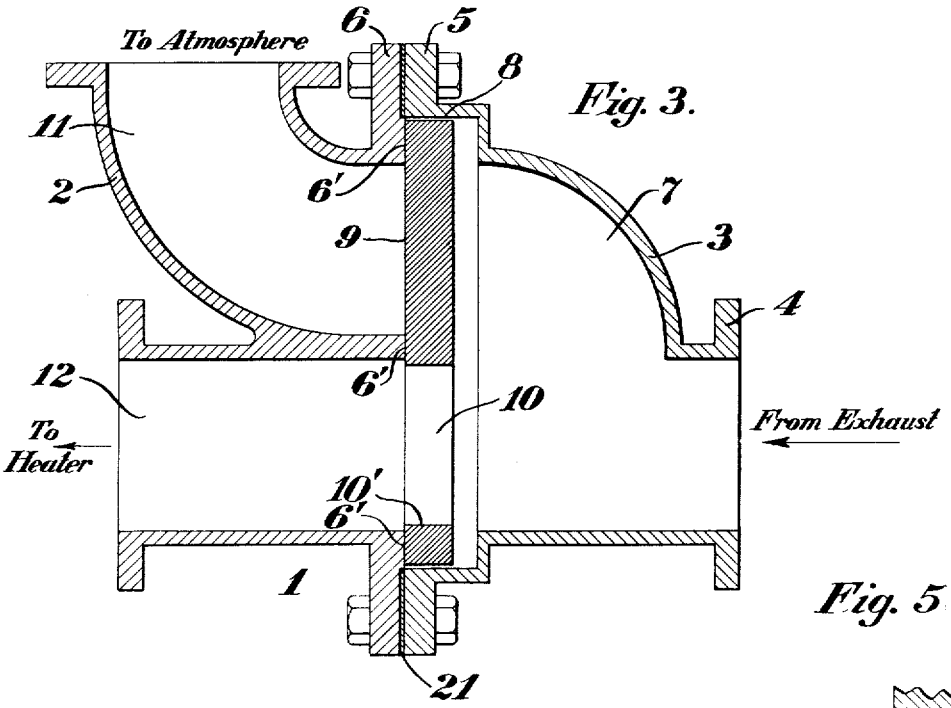
Fig. 3 is a side elevational view in section, taken on line 3—3 of Fig. 2, in the direction indicated by the arrows.

To more clearly show the relation between valve disc 10, and inlet chamber 7 and the outlet ports of member 2, Fig. 3 is a sectional view, the section of valve body members 2 and 3, and of disc 10 being taken on line 3—3 of Fig. 2, in the direction indicated by the arrows.

By moving the handle 19, the valve disc may be rotated to cause the aperture 10' to register with either of the outlet conduits 11 or 12, or partially with both, and at the same time block off the other annular opening, or a portion of both of the openings. As stated above, the fluid or hot gases entering the valve chamber 7 may, by operating the handle 19, be directed to a selected outlet pipe or conduit to the exclusion of the other, or the total flow may be divided in any desired proportion between the outlet pipes. The movement of the handle, however, is limited to prevent the valve disc from being rotated to a position at which it will completely block the passage of gases from the chamber 7. This is particularly necessary when the valve is utilized as described to control the flow of exhaust gases of an internal combustion engine, since, if no outlet is provided, or in other words, if the passage is blocked, the engine will choke and fail to function.

To indicate the position of valve disc 10 and to ensure complete and free communication with the desired outlet conduit, the notched quadrant 22, suitably secured to the casting 2, as by lugs and bolts 23 and 24 respectively, is provided. The end notches 25 and 26 in the quadrant bear such relation to conduits 11 and 12 and to the aperture 10' of the valve disc, that when the latch 27 pivoted to the actuating handle 19 is in notch 25, all of the gases flow through the conduit 12, and when in notch 26, all of the gases flow through conduit 11. Both conduits are partially opened so that the gas flow will be divided between the two conduits when the latch 27 is engaged in intermediate notches of the quadrant.

While the valve as above described comprises but two conduits with which a valve disc having a single aperture cooperates, it will be understood that, in so far as certain aspects of my invention are concerned, a greater number of conduits may be provided and the number of apertures in the valve disc co-acting therewith may remain the same or be increased, as desired.

When a valve, for example, of the gate type, is utilized to control the flow of gases at elevated temperatures, particularly those of corrosive or chemically active nature, the seat of the valve is in contact with and subjected to the detrimental action of the gases. Ultimately, within a more or less short period of time, the seat becomes pitted or corroded to an extent rendering the valve, in its closed position, inefficient or ineffective to prevent flow therethrough. In the construction above described, and particularly when employed in types of installations in which division of flow is not effected to substantial extent, the seating or finished surface 6' of member 2 and the back or co-acting surface 9 of valve disc 10 are not in contact with gases flowing through the valve, since each covers and thereby protects the other, and the effectiveness of such parts as a seal is unimpaired by the physical, and particularly the chemical properties of corrosive material passing through the valve.

What I claim is:

1. Valve mechanism comprising a chamber having an inlet, a finished surface internally thereof, an outlet port terminating in said finished surface, a movable member having a finished face in contact with and covering said surface to an extent sufficient to form a fluid seal therebetween and an aperture adapted to be brought into register with said outlet port, the movement of said member being limited so that at all times it covers the portion of the surface with which it coacts substantially entirely, means having a portion extending through said movable member, a portion coacting with a seating portion of said movable member to form a fluid tight universal joint whereby leakage along said means is prevented, and another portion coacting with a second portion of said member whereby movement of said means may be transmitted to said member, and means for maintaining the movable member and the means first mentioned in continuous engagement with each other.

2. Valve mechanism comprising a casing having an inlet and a plurality of outlets, a finished surface within said casing, said outlets terminating at said finished surface, a movable member in said casing having a finished face engaging said finished surface and an aperture adapted to register with either or partly with two of said outlets, actuating means for said movable member having a flared portion engaging a seat in said member which permits restricted universal movement therebetween and a key portion loosely engaging a recess in said movable member, and means on the outlet side of said casing which cooperates with the actuating means to maintain the flared portion thereof in fluid-tight engagement with its seat in said movable member.

3. In a valve mechanism adapted for passage therethrough of exhaust gases from an internal combustion engine, a casing having an inlet chamber adapted to receive such gases, a finished surface within said chamber, outlet ports terminating in said finished surface, a movable member having a finished face in engagement with and substantially entirely covering said finished surface and an aperture adapted for registration with one or partly with two of said outlets, actuating means for said movable member extending from the outlet side thereof into said casing and terminating in said movable member, the terminal end of said actuating means having a portion loosely keyed in a recess in the movable member and another portion which forms a fluid-tight joint and which permits restricted universal movement between such parts, means for maintaining the last mentioned co-acting parts of the movable member and its actuating means in fluid-tight engagement, and means for restricting the rotary movement of the movable means, so that at all times its aperture will be in register with one or partly with two of said outlets.

LESTER M. GOLDSMITH.